R. A ILG.
MOTOR SUPPORT.
APPLICATION FILED FEB. 24, 1920.
1,359,600.
Patented Nov. 23, 1920.
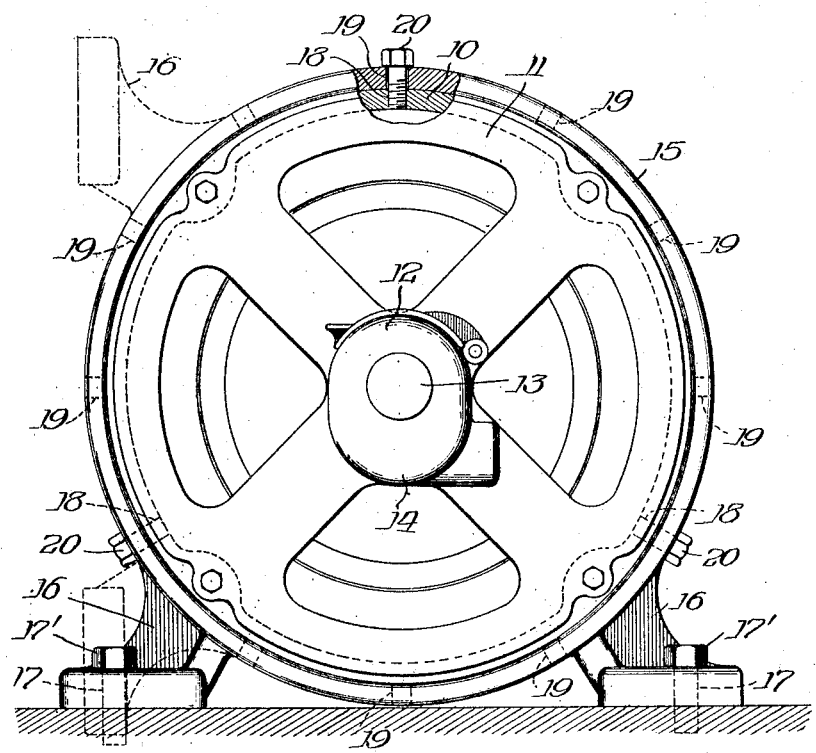

UNITED STATES PATENT OFFICE.

ROBERT A. ILG, OF CHICAGO, ILLINOIS, ASSIGNOR TO ILG ELECTRIC VENTILATING COMPANY, OF CHICAGO, ILLINOIS, A CORPORATION OF LOUISIANA.

MOTOR-SUPPORT.

1,359,600.   Specification of Letters Patent.   Patented Nov. 23, 1920.

Application filed February 24, 1920. Serial No. 360,720.

*To all whom it may concern:*

Be it known that I, ROBERT A. ILG, a citizen of the United States, residing at Chicago, in the county of Cook and State of Illinois, have invented certain new and useful Improvements in Motor-Supports, of which the following is a specification.

This invention relates to supporting devices for motors, and has reference more particularly to a novel device by which an electric motor may be strongly supported and held in running position on the floor, side wall, or ceiling of the room in which it is used, and without necessitating any turning of the motor about its axis in shifting it from one position to another. Most electric motors are equipped with an oil well as a part of the lubricating system of the motor, which necessitates the mounting of the motor always the same side up to prevent spilling or leakage of the oil; and the chief object of the present invention is to provide a simple, practical and inexpensive motor holder or support of such a nature that it may with equal facility be attached to the floor, side wall, ceiling or any other surface whether horizontal, vertical or inclined and in any of these different positions shall support the motor upright or without any shifting about its axis.

My invention, its manner of use, and advantages will readily be understood by persons skilled in the art from the following description, taken in connection with the accompanying drawing, wherein I have illustrated one practical form or embodiment of the principle of the invention, and in which—

The figure is a side elevation, partly in section, of a conventional type of electric motor equipped with my improved support.

Referring to the drawing, 10 designates the circular field frame of the motor, and 11 one of the end plates or spider frames carrying the bearing 12 for the armature shaft 13 and also the usual oil well 14, in which latter dip the usual rings (not shown) that are suspended from the shaft and carry the oil up onto the latter.

15, designates a ring or band that encircles the field frame 10 and is formed with a pair of feet 16 provided with holes 17' to receive fastening screws 17 by which the ring or band may be securely attached to the floor, wall or ceiling of a room. In the periphery of the circular field frame 10 are formed a series of tapped holes 18, herein shown as three in number, located one hundred and twenty degrees apart. Through the ring or band 15 are formed a series of holes 19, herein shown as twelve in number, located thirty degrees apart. Machine screws 20 pass through certain of the holes 19 which register with the holes 18 and screwed into the latter securely unite the ring or band 15 to the field frame 10. In the full line position of the holder shown in the drawing it is adapted to support the motor on the floor or any raised horizontal support. If it is desired to mount the motor on a side wall, the screws 20 are withdrawn, the ring is turned through an angle of ninety degrees bringing in a new set of holes 19 into register with the tapped holes 18 of the motor frame, and the screws 20 are replaced, thereby effecting the adjustment indicated by the dotted line position of the ring, in which its feet 16 are adapted for attachment to a vertical surface; such as a side wall or post. Obviously by adjusting the ring half way around the motor frame in the same manner, the feet 16 will be on top and adapted for attachment to a ceiling or other overhead horizontal support from which the motor is suspended. Of course, the particular number of holes in the motor frame and ring and the number of fastening screws used is immaterial, so long as the ring has holes which will be in register with the tapped holes of the field frame in any desired adjustment of the ring or holder around the frame.

From the foregoing it will be seen that my invention does away with the necessity of either providing separate motor supports for horizontal, vertical and inclined attaching surfaces or turning the motor itself on its own axis when shifting its position from a horizontal to a vertical or inclined attaching surface, or the reverse, which latter is impractical without interfering with the automatic lubrication system commonly used on electric motors of the type shown.

I claim—

1. The combination with an electric motor, the field frame of which has a tapped hole, of a ring embracing said field frame and formed with one or more attaching feet and also with a plurality of circumferentially spaced holes, and a fastening screw adapted to enter any one of said spaced holes and the tapped hole of the field frame, whereby said ring may be attached to said field frame in different positions around the axis of said motor.

2. The combination with an electric motor, the field frame of which has a plurality of equally spaced radial tapped holes, of a ring embracing said field frame and formed with one or more attaching feet and also with a plurality of circumferentially spaced holes adapted to register with the tapped holes of said field frame in different positions of said ring around the axis of said motor, and fastening screws coöperating with said holes to attach said ring to said field frame.

ROBERT A. ILG.